United States Patent
Crismon et al.

(10) Patent No.: US 10,035,408 B2
(45) Date of Patent: Jul. 31, 2018

(54) VEHICLE ROOF SYSTEM MOUNTING TO EXISTING FRAME AND ATTACHMENT POINTS

(71) Applicants: David Crismon, Springville, UT (US); Monte Johnson, Salt Lake City, UT (US); David Pixton, Highland, UT (US)

(72) Inventors: David Crismon, Springville, UT (US); Monte Johnson, Salt Lake City, UT (US); David Pixton, Highland, UT (US)

(*) Notice: Subject to any disclaimer, the term of this patent is extended or adjusted under 35 U.S.C. 154(b) by 0 days.

(21) Appl. No.: 14/827,394

(22) Filed: Aug. 17, 2015

(65) Prior Publication Data
US 2016/0046241 A1 Feb. 18, 2016

Related U.S. Application Data

(60) Provisional application No. 62/038,223, filed on Aug. 16, 2014.

(51) Int. Cl.
*B60J 7/02* (2006.01)
*B60J 7/10* (2006.01)
*B60R 9/04* (2006.01)
*B60J 7/11* (2006.01)

(52) U.S. Cl.
CPC ............... *B60J 7/106* (2013.01); *B60J 7/102* (2013.01); *B60J 7/11* (2013.01); *B60R 9/04* (2013.01)

(58) Field of Classification Search
CPC ..... B60J 7/106; B60J 7/02; B60J 7/022; B60J 7/0262; B60J 7/026; B60J 7/024; B60J 7/04; B60J 7/08; B60J 7/11; B60J 7/0053; B60J 7/0076; B60J 7/196; B60J 7/19; B60J 7/102; B60R 9/04
USPC ... 296/218, 216.04, 100.03, 147–148, 26.05, 296/26.09, 26.13, 216.01, 216.06, 216.07, 296/216.08, 216.09, 100.04, 107.19
See application file for complete search history.

(56) References Cited

U.S. PATENT DOCUMENTS

| | | | | |
|---|---|---|---|---|
| 5,738,405 | A * | 4/1998 | Richters | B60J 1/085 296/146.15 |
| 6,428,090 | B1 * | 8/2002 | Reinsch | B60J 7/0053 296/216.08 |
| 6,530,621 | B1 * | 3/2003 | Williams | B60R 9/00 224/326 |
| 6,851,739 | B2 * | 2/2005 | Morley | B60J 1/08 280/756 |
| 7,163,260 | B2 * | 1/2007 | Reitzloff | B60J 1/14 296/219 |
| 7,367,615 | B1 * | 5/2008 | Fallis, III | B60J 1/17 296/216.01 |
| 7,914,064 | B2 * | 3/2011 | Joab | B60J 1/1884 296/100.03 |
| 8,991,896 | B1 * | 3/2015 | Whitehead | B60J 7/106 296/121 |
| 9,114,690 | B1 * | 8/2015 | Bowles | B60R 21/13 |
| 2005/0134096 | A1 * | 6/2005 | Fallis, III | B60J 7/0053 296/218 |
| 2010/0038933 | A1 * | 2/2010 | Comfort | B60J 7/022 296/216.08 |

* cited by examiner

Primary Examiner — Scott McNurlen (57) ABSTRACT

A substantially planar roof frame comprising: at least one rail, a front frame member, and a rear frame member. The at least one rail has surfaces suitable to permit attachment and detachment of accessories independent of roof top and side panels.

10 Claims, 10 Drawing Sheets

FIG. 1 (PRIOR ART)

FIG. 2 (PRIOR ART per US6755332)

FIG. 3 (PRIOR ART per US6588824)

FIG. 4 (PRIOR ART per US5738405)

FIG. 5 (PRIOR ART per US5947546)

FIG. 6 (PRIOR ART per US6530621) (Amended)

VEHICLE ROOF SYSTEM MOUNTING TO EXISTING FRAME AND ATTACHMENT POINTS

CROSS-REFERENCE TO RELATED APPLICATIONS

The present application claims priority to the earlier filed provisional application having Ser. No. 62/038,223, and hereby incorporates subject matter of the provisional application in its entirety.

BACKGROUND OF THE INVENTION

Technical Field of the Invention

This invention relates to sport utility vehicles, most specifically to a roof rail system that provides for multiple configurations of roof panels and mounting of accessories.

Background Art

Sport utility vehicles are defined by their ability to transport both people and cargo over a variety of terrains and under varied driving conditions. To enhance their usefulness, some sport utility vehicles are supplied with a convertible roof. Partial or complete removal of the vehicle's roof provides the occupants with a feeling of openness while traveling and enables the occupants to increase their enjoyment of the outdoor environment. Further, complete removal of the vehicle's roof and even its doors is often desirable to improve the driver's visibility of surrounding obstacles. This is particularly advantageous when such vehicles are used in rugged off-road environments where enhanced visibility of such obstacles may be essential for successful navigation. Sometimes it is desirable to remove the vehicle's roof simply to increase the available cargo space inside the vehicle.

Most of these convertible sport utility vehicles are used under changing operating conditions. Thus, where a removable roof may be desirable for recreational driving conditions, it may be necessary to reconfigure the roof for other use conditions encountered in the same excursion, including inclement weather or urban driving where noise reduction or security of the vehicle's contents is important. In addition, certain off-road vehicle configurations may not satisfy on-road regulatory requirements, and therefore the vehicle must be reconfigured according to legal regulations prior to driving on highways.

Perhaps the best-known example of a convertible sport utility vehicle is a Jeep-type vehicle. This vehicle is often equipped with a unitary hard top that is removable to expose passenger and cargo space to the open environment. Because removal and storage of the hard top are typically time consuming and difficult, the unitary top does not provide a practical solution for reconfiguring the roof to accommodate dynamic operating conditions. To address this need, a flexible soft top and its supporting structure may be installed onto the vehicle during periods of varied vehicle use conditions (such as during the summer season or during off-road trips). This roof construction affords quicker response to changing driving or weather conditions and stows in a compressed space; however, it suffers in comparison to the hard top when considering its ability to provide a quiet and secure interior space.

Cost is another substantial disadvantage for unitary hard tops. From a vehicle producer's point of view, manufacture of unitary tops is costly and requires large expensive machinery. Relatively minor changes to vehicle geometry due to model year updates require expensive mold changes; consequently, design flexibility for improvements in styling and functionality must be weighed against the high cost of mold changes. From an owner's point of view, most often damage to a small region of the hard top cannot be repaired and requires replacement of the entire top. Furthermore, shipping of such large parts is expensive due to the bulk of the parts and the protection means required.

From the above discussion it is clear that there is a need for a roof system for sport utility vehicles that provides for flexibility in configuration, provides modularization for easy handling and storage of roof components, and reduces the cost of manufacture and shipping of roof components.

A further capability that would substantially enhance the utility of the roof system just mentioned would be the provision for mounting accessories atop the roof. To further improve the capacity of vehicles to carry cargo items, a large number of after-market racks, baskets, and other carrying devices have been made commercially available. These enable the vehicle to carry large or bulky items, even those that do not easily fit within the confines of the vehicle, such as bicycles or watercraft.

Unfortunately, most existing convertible roof designs are fundamentally incompatible with the use of roof-top cargo and accessory systems. Often the two design objectives compete for the same space in the vehicle's headroom. Further, in the case of the removable hard top just mentioned, typically the hard top's construction is not suitable for withstanding the forces applied by any substantial roof-borne cargo. Such forces include potentially large static loads from roof-carried items and the rack or basket itself, and potentially large dynamic loads from shocks, vibration, or air movement, all typically induced by the driving process. Easily collapsible soft tops, while convenient to configure, are also not suitably structurally robust to handle such loads. Hard top or soft top roofs can be strengthened by braces and other devices that ultimately transfer the roof-borne loads to the vehicle frame; still, once the top is removed, these roof-top cargo systems are also necessarily removed. A provision for mounting roof-top cargo systems independently of a reconfigurable roof top would provide substantial advantage to the vehicle operator.

The above-mentioned challenges have given rise to a variety of concepts designed to improve the configurability of a sport utility vehicle's roof and interior space. Some concepts include the use of tracks or linkages and collapsible frame members to provide for an expandable and retractable/removable covering over the rear part of the vehicle (see for example U.S. Pat. No. 6,431,634, U.S. Pat. No. 7,367,615, U.S. Pat. No. 6,588,824, U.S. Pat. No. 7,240,960 and U.S. Pat. No. 5,738,405). Such systems provide for simplicity of reconfiguration and (in some cases) in-vehicle storage of frame and roof members; however, they are limited in functionality in that they are not specifically adapted to carrying external loads such as may be applied by roof-mounted aftermarket items. Moreover, such systems are designed such that once retracted, no rear frame members remain, limiting the size and extent of any available rooftop attachment locations.

To deal with this limitation, some aftermarket rack providers have provided an external frame that is mounted to the frame of the vehicle (see U.S. Pat. No. 6,755,332). Though this type of frame may be hinged or otherwise mobilized to facilitate moving portions of the rack out of the way when reconfiguring the roof, the rack must be unloaded of its cargo in order to make practical use of this feature. In addition, the frame itself contains uprights that make access to portions of the roof more difficult. Furthermore, in order to avoid interference with hard and soft top installations, they require mounting techniques that cause irreparable alterations or other such damage to the vehicle. They also add substantial weight to the vehicle in order to provide the required load bearing capacity—in essence, they create a redundant load bearing frame built upon the vehicle's intrinsic frame. One inventor has built the capability to support a roof-mounted rack into a soft top support frame (US2014077521), in effect combining the external frame concept with a soft top frame. Unfortunately, this system has no provision for use with a hard top configuration.

One system that addresses both the desire for configurable roof top and side panels and the ability to support externally mounted accessories is given in U.S. Pat. No. 7,303,227. This roof system recognizes the utility of a provision for car-top cargo space, while allowing for retraction of a substantial portion of the vehicle roof. However, this concept requires a frame that is integral with the vehicle frame and therefore does not lend itself well to after-market installation or easy removal. A second similar concept is shown in U.S. Pat. No. 6,530,621. In this convertible track system, a roof structure is composed of several vertical and horizontal members that are fixedly attached to the lower frame of the vehicle and thereby become integral with that structure, forming the upper part of the vehicle frame structure. These members have tracks to support and retain roof members as is common in the art (see particularly patents relating to sun roof installations) but also offer the advantage of providing adequate support for externally mounted devices. This integral frame design requires implementation in a new vehicle build or necessitates irreversible vehicular modifications in order to retrofit it to an existing vehicle. Also, such a design builds in unneeded cost and complexity to the overall automobile design, since the upper frame geometry is complex throughout, whereas some of the functions of the frame could be borne by simpler or less expensive members.

In this particular case it is advantageous from both a cost and a performance point of view to separate the functional requirements of vehicle structure from those of roof panel attachment, accessory attachment, and overall aesthetics. This suggests the utility of using a non-integral roof frame to provide for roof panel and accessory attachment, allowing the roof frame and the vehicle frame to each be optimized separately for their specific functions. By way of example, the materials and cross-sectional geometry of a vehicle frame member such as a roll bar can be quite less expensive and more effective in providing rollover protection if optimized for only that function as opposed to also requiring complex and aesthetically pleasing attachment geometries.

From the foregoing discussion, it is evident that there is a need for a flexibly configurable roof frame for sport utility vehicles that also offers accommodation of auxiliary attachments such as roof racks and other accessories. This roof frame is ideally inexpensive for the consumer and can be easily retrofitted to an existing vehicle without making permanent modifications.

It is therefore an object of the present invention to provide an aesthetically-pleasing roof frame that houses roof and body panels independently from roof-mounted accessories, allowing multiple independent configurations of each. It is a further object of the invention to provide a roof frame that is optimized for accommodating loads related to the roof and associated attachments but which depends on other available structural strength within the vehicle itself to support the roof frame itself and to accommodate other vehicular loading scenarios. It is yet a further object of the invention to apply the roof frame to the vehicle using only those attachment points that are already in place to avoid the need for making permanent modifications to the vehicle. This makes the invention removable and equally applicable to new vehicles and existing vehicles that are presently owned by consumers.

Further, it is an object of the present invention to utilize simple frame elements that are modular, cost effective, and adaptable over a large number of automotive frame sizes and styles, such as may be exhibited by progressive model years of a single design or by substantially different designs, including different roof styles. Finally it is an object of the present invention to provide for adjustability of the frame to accommodate manufacturing tolerances and minor model variations and still provide for adequate attachment of roof and side panels.

SUMMARY OF THE INVENTION

In the most preferred embodiment of the present invention, a substantially planar roof frame comprises: two side rails that are each removably attached to a vehicle frame at two standard attachment points; a front frame member that is rigidly attached to the two side rails and sealably attached to the vehicle's windshield frame; and a rear frame member that is removably attached to the two side rails. The side rails have surfaces suitable for attaching roof top panels, roof side panels, and roof-top accessories thereto; the attachment surfaces are oriented to permit attachment and detachment of accessories independent of the roof top and side panels. The side rails are positioned to provide a surface against which the tops of the vehicle's doors may seal. The front and rear frame members have surfaces suitable to sealably attach roof top panels thereto. The rear frame members have additional surfaces suitable to attach rear panels thereto.

BRIEF DESCRIPTION OF THE DRAWINGS

These and other objects, aspects, and advantages of the present invention will become evident from the following detailed description. Exemplary illustrations are provided to further aid understanding of the invention but are not intended to limit the scope of the invention. These illustrations are divided into a series of figures where.

DETAILED DESCRIPTION OF THE PREFERRED EMBODIMENTS

Figure 1:
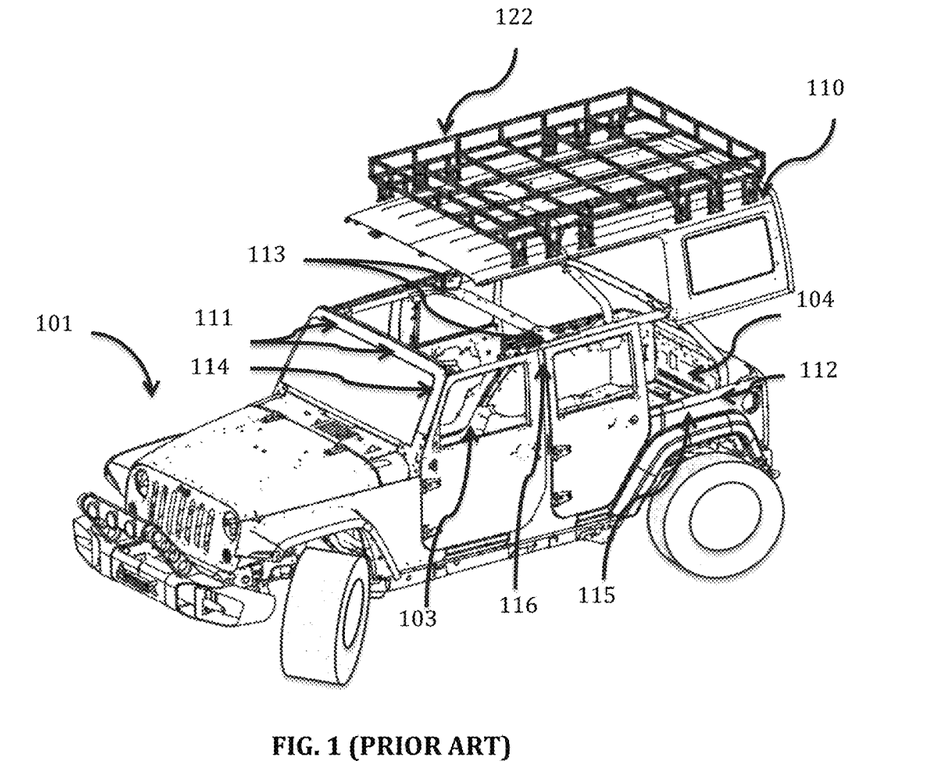
FIG. 1 is a front perspective view of an exemplary sport utility vehicle having a removable hard top enclosure found in the prior art.

Referring to FIG. 1, a convertible sport utility vehicle 101 is supplied with a removable hard top 110 that is secured to the vehicle at standard attachment points 111, 112, and 113 on vehicle frame members 114, 115, and 116. Frame member 116 may also be referred to as the vehicle's "cabin frame" that, in one embodiment, comprises what is commonly referred in the industry as a "B pillar" and a "roll bar" structure; likewise, frame member 114 may alternatively be referred to as the vehicle's "windshield frame". Vehicle frame members 114, 115, and 116 are typically constructed with suitable durability to bear the loads placed on the vehicle while providing safety and comfort to the occupants during normal and abnormal driving conditions, including rollover. In the prior art, removable hard top 110 is unsuitable structurally or geometrically for attaching and bearing the static and dynamic loads associated with a roof-top auxiliary cargo space, such as basket 122. Hard top 110 may be reinforced such that it can bear the loads associated with a roof-top auxiliary cargo space; such reinforcements typically gain their support from vehicle frame members 114, 115, or 116 in order to provide the reinforcement with suitable structural strength. Because this support design and basket 122 are both integral with the hard top structure, removal of the hard top results in removal of the roof-top auxiliary cargo space. Hard top 110 typically requires multiple personnel or specialized lifting devices to handle because of its large size and weight. It also requires substantial storage space when removed due to its large unitary construction.

Figure 2:
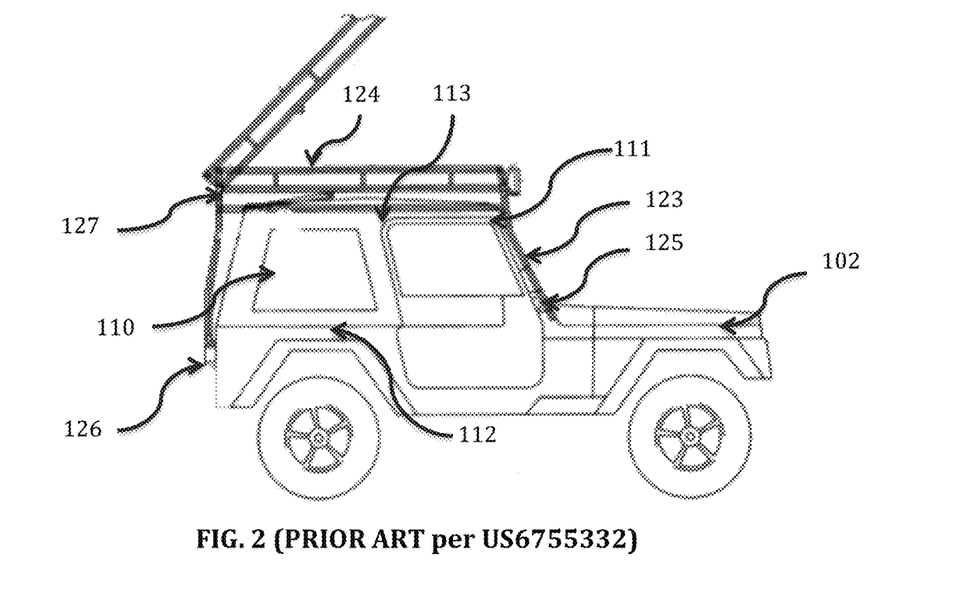
FIG. 2 is a side view of an exemplary sport utility vehicle having an auxiliary storage area atop the vehicle supported by a rigid external frame found in the prior art.

As shown in FIG. 2, a prior art solution to supplying auxiliary cargo space is to secure an external frame 123 to the vehicle, which is independent of hard top 110 and which has suitable strength and rigidity to support a basket 124. The external frame 123 utilizes mounting locations 125 and 126 that are separate from standard attachment points 111, 112, and 113, since the latter attachment points are already occupied to attach hard top 110. Providing for mounting locations 125 and 126 requires modifications to standard vehicle body 102. To gain access to the vehicle roof, such as hard top 110, for the purpose of reconfiguration or removal, basket 124 may be moved out of the way via pivots 127. However, basket 124 must be emptied of its contents prior to moving out of the way, and access to hard top 110 for the purpose of removing or reconfiguring it is still limited by members of external frame 123.

Figure 3:
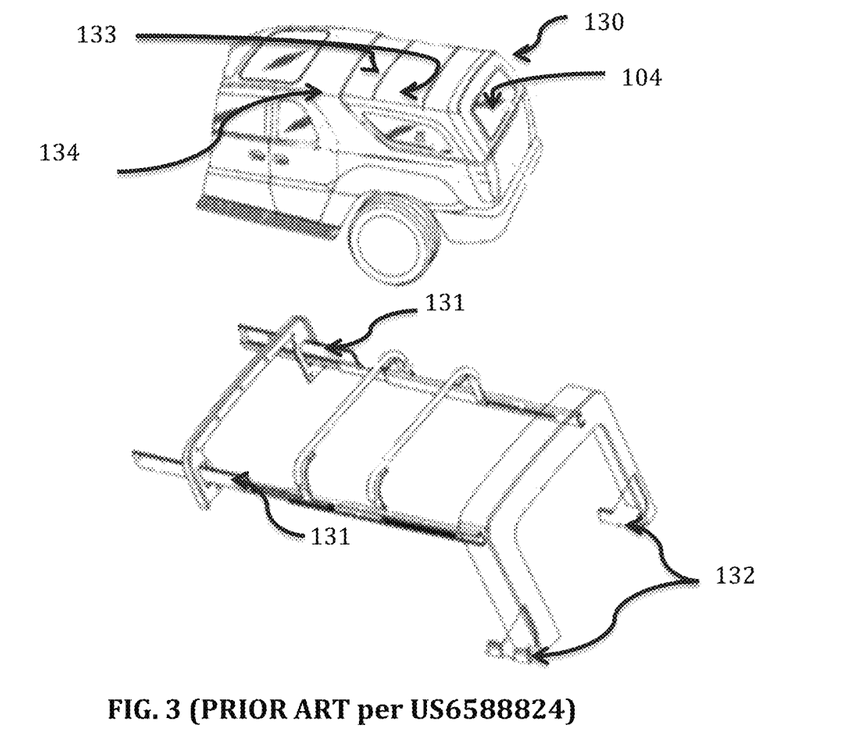
FIG. 3 is a rear perspective view of an exemplary sport utility vehicle having a collapsible hard covering over its cargo area, as found in the prior art.

A prior art convertible roof design that addresses the aforementioned handling and storage difficulties is shown in FIG. 3. In this design, collapsible hard top 130 is supplied with slidable bearing surfaces 131 and 132 and nestable sections 133 to facilitate expansion or contraction of the top relative to stationary roof portion 134 to expose cargo area 104. Stationary roof portion 134 is typically defined as the region between "A" and "B" pillars of the sport utility vehicle. This roof construction does not accommodate roof-top auxiliary cargo space such as basket 122, unless basket 122 is substantially reduced in size to fit atop stationary roof portion 134, or unless an external frame such as that depicted in FIG. 2 is used. A roof-top auxiliary cargo space attached to the collapsible hard top 130 would interfere with its ability to be contracted or expanded.

Figure 4:
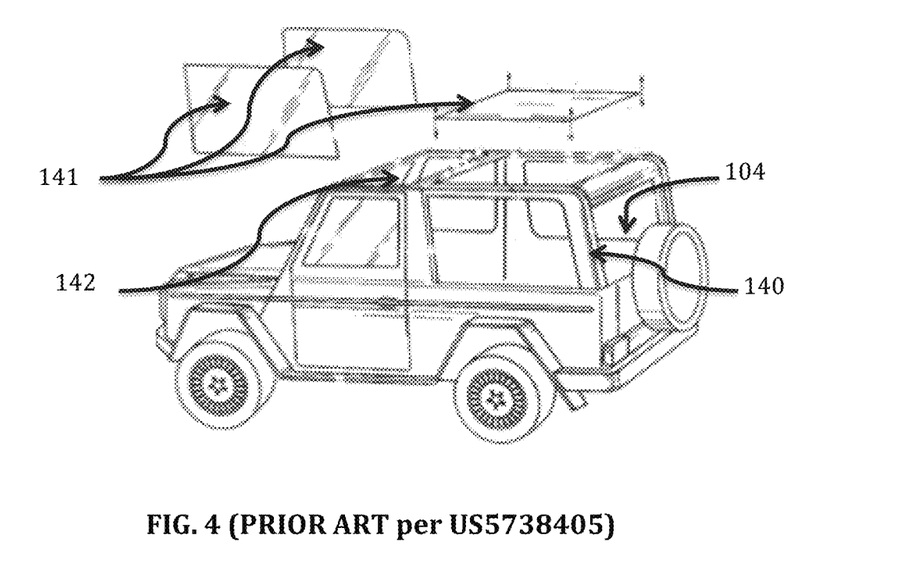
FIG. 4 is a rear perspective view of an exemplary sport utility vehicle having a removable hard covering over its cargo area, consisting of removable frame and panels found in the prior art.

Referring to FIG. 4, an alternative prior art convertible roof design provides removable frame 140, into which hard top panels 141 may be affixed. Hard top panels 141 are substantially flat and of an overall geometry that facilitates storage in small spaces, such as cargo area 104. Removable frame 140 does not accommodate roof-top auxiliary cargo space such as basket 122, unless basket 122 is substantially reduced in size to fit atop stationary roof portion 142, or unless an external frame such as that depicted in FIG. 2 is used. A roof-top auxiliary cargo space attached to the removable frame 140 would interfere with its ability to be removed.

Figure 5:
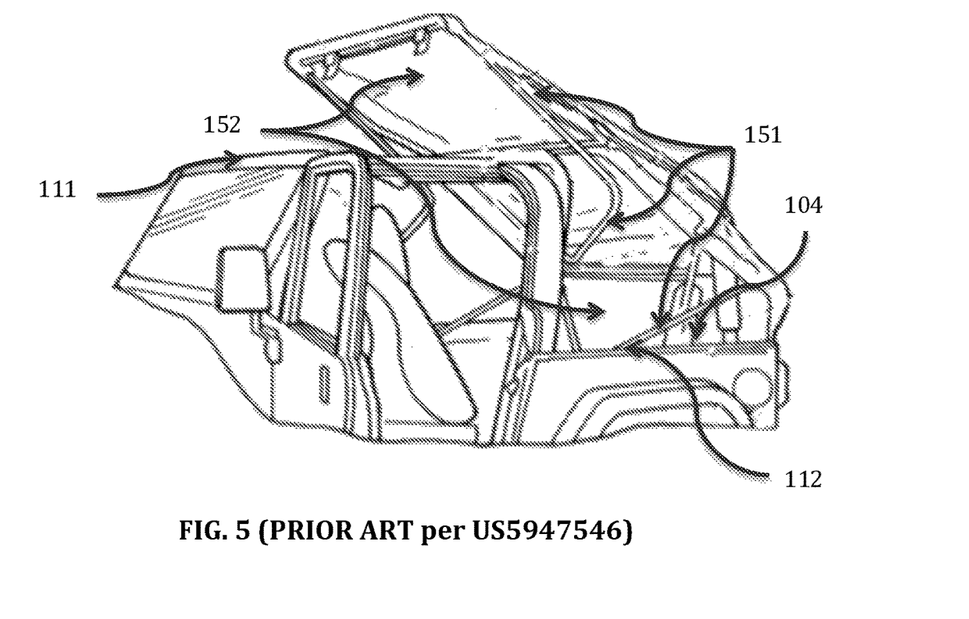
FIG. 5 is a front perspective view of an exemplary sport utility vehicle having a retractable soft covering found in the prior art.

A further prior art convertible roof design is shown in FIG. 5. In this solution, frame members 151 may be secured to standard attachment points 111 and 112 to create a support for easily removable and foldable soft top panels 152. Frame members 151 and soft top panels 152 may be collapsible to expose cargo area 104; if so, the collapsible frame members cannot support roof-borne auxiliary cargo space such as basket 122 without interfering with the collapsing function of the soft top.

Figure 6:
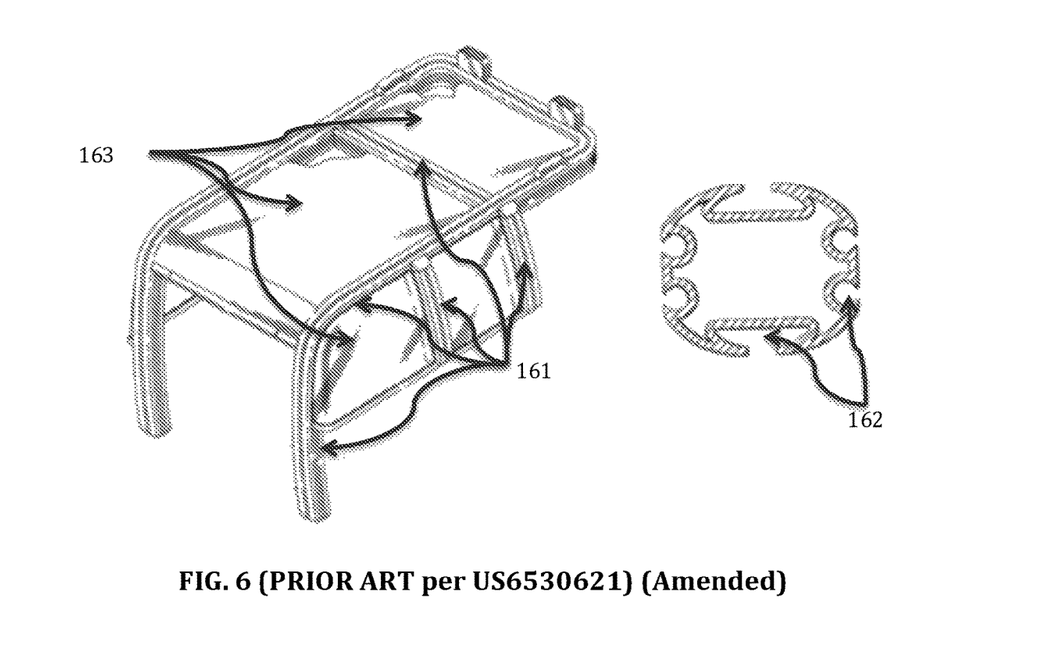
FIG. 6 is a rear perspective view of an integral roof frame assembly found in the prior art consisting of vertical and horizontal frame members that are fitted with attachment points for roof panels and other mounted objects.

FIG. 6 depicts a prior art roof frame composed of vertical and horizontal frame members 161 containing attachment geometries 162, whereto panels 163 may be affixed. Additionally, an auxiliary cargo space such as basket 122 may be attached to frame members 161 via attachment geometries 162. This frame design is self-supporting and forms a roof frame that sits atop the vehicle frame via the vertical frame members 161, thereby becoming an integral part of the vehicle frame. Thus, the vertical frame members must be of sufficient strength and rigidity to support the horizontal frame members and anything attached thereto. This integral structure is not a removable structure such as that shown in FIG. 4, nor does the integral nature of the design lend itself to application to an existing vehicle without modification of the vehicle frame to provide suitable attachment points. Passenger safety under various abnormal driving conditions, such as rollover, must be provided by the roof frame structure. It is conceivable that such a vehicle may be supplied with a secondary frame underneath the integral roof frame to provide further passenger protection; nevertheless, such a frame would be redundant to the roof frame under the objects of this prior art invention, and would not be the roof frame's primary supporting structure, as is the object of the present invention.

Figure 7:
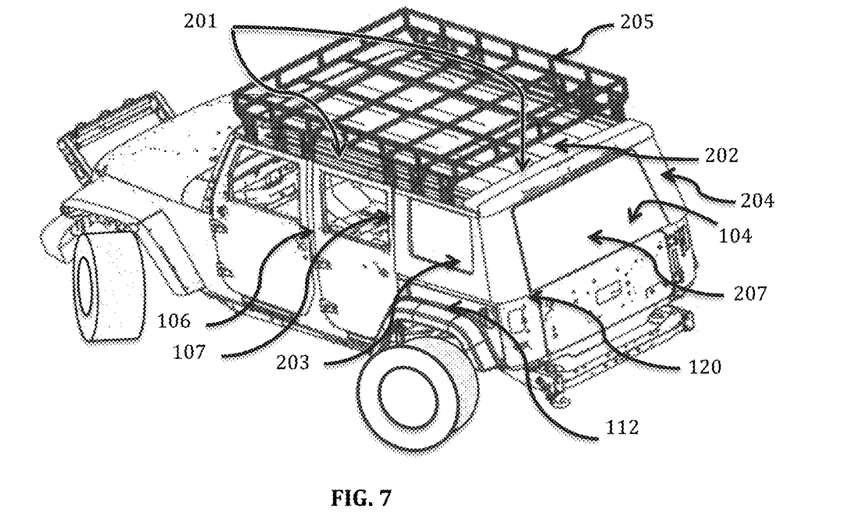
FIG. 7 is a rear perspective view of the most preferred embodiment of the present invention, including a roof frame and roof panels attached thereto, with an auxiliary cargo space also attached thereto.

Referring to FIG. 7, according to the most preferred aspects of the present invention, a substantially planar roof frame 201 is removably attached to the vehicle frame of a sport utility vehicle in a manner to be detailed hereafter. Top panels 202, side panels 203, and rear panel 204 are removably attached to roof frame 201. In addition, side panels 203 and rear panel 204 are also removably attached to the vehicle frame at standard attachment points 112 and 120 respectively. A hinged panel 207 in rear panel 204 may be provided to allow access to cargo area 104 without removing rear panel 204. Hinged panel 207 may also be activated by a motor to provide for automated opening and closure of the panel. In the most preferred embodiment, hinged panel 207 is translucent, constructed of glass or a translucent polymer. Likewise, side panels 203 are most preferably constructed with glass or a translucent polymer over at least a portion of the panels. Top panels 202 may similarly include glass or a translucent polymer in their construction. Further, a roof-top auxiliary cargo space such as rack 205 is removably attached to roof frame 201.

Figure 8:
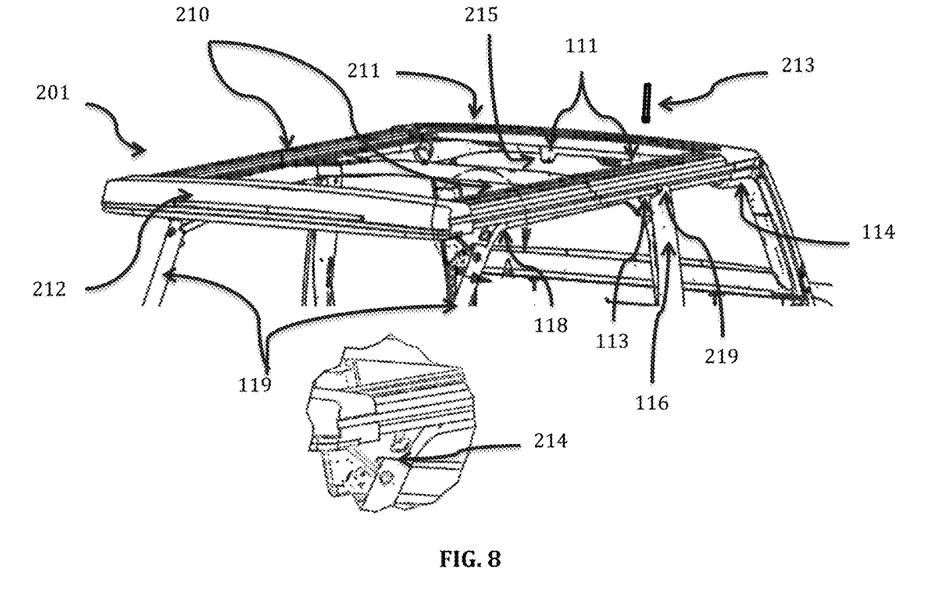
FIG. 8 is a top-rear perspective view of the most preferred embodiment of the present invention showing a roof frame without any panels or auxiliary cargo space attached thereto.

Further detail pertaining to roof frame 201 is shown in FIG. 8. In the most preferred embodiment, substantially planar roof frame 201 comprises two side rails 210, a front header assembly 211, and a rear header assembly 212. For the purposes of this description and the subsequent claims, the term "substantially planar" shall be understood to mean that all members comprising the referenced object are constrained to lie within a space bounded by two parallel planes that are positioned a certain distance apart. This space bounds both the thickness of the parts as well as any curvature given the parts for aesthetic or other reasons. In the most preferred embodiment, the distance between planes is eight inches or less. In other embodiments the distance between planes may be as much as 12 inches. Therefore, when assembled together, side rails 210, front header assembly 211, and rear header assembly 212 all lie within said bounding space, since roof frame 201 is described as being "substantially planar". Side rails 210 are removably attached to at least two standard attachment points 113 and 118 on the cabin frame of the vehicle, via threaded connectors 213 and bracket 214 (see also FIG. 18). Side rails 210 may contain notch 219 to provide clearance with vehicle frame member 116 and provide a means of locating frame 201 during assembly onto the sport utility vehicle 101. Front header assembly 211 is removably attached to vehicle frame member 114 at standard attachment points 111 via clamps 215, whereby a seal is effected between the vehicle frame member 114 and the front header assembly 211. Side rails 210 are fixedly attached to front header assembly 211 in a perpendicular attitude, forming a rigid u-shaped structure. Rear header assembly 212 is removably attached to side rails 210 in a perpendicular attitude, forming a closed rectangular frame structure when present. For the purpose of clarity, when description is made of items being arrayed in a parallel or perpendicular attitude, being of constant distance apart, or being flush with other items it shall be understood to mean that these comparative standards are within standard tolerances achieved in the industry by common manufacturing processes known in the art.

Further detail pertaining to roof frame 201 is shown in FIG. 8. In the most preferred embodiment, roof frame 201 comprises two side rails 210, a front header assembly 211, and a rear header assembly 212. Side rails 210 are removably attached to at least two standard attachment points 113 and 118 on the cabin frame of the vehicle, via threaded connectors 213 and bracket 214 (see also FIG. 18). Side rails 210 may contain notch 219 to provide clearance with vehicle frame member 116 and provide a means of locating frame 201 during assembly onto the sport utility vehicle 101. Front header assembly 211 is removably attached to vehicle frame member 114 at standard attachment points 111 via clamps 215, whereby a seal is effected between the vehicle frame member 114 and the front header assembly 211. Side rails 210 are fixedly attached to front header assembly 211 in a perpendicular attitude, forming a rigid u-shaped structure. Rear header assembly 212 is removably attached to side rails 210 in a perpendicular attitude, forming a closed rectangular frame structure when present.

Vehicle frame members 114, 116, and 119 serve as uprights providing both geometrical positioning and structural support to roof frame 201, as shown in FIG. 8. Vehicle frame members 114, 116, and 119 also provide general structural stability and safety during various driving conditions, including abnormal conditions, such as vehicle rollover, and are designed with geometries and materials that are optimal for such service. Unlike the uprights depicted in FIG. 6, the relatively complex attachment geometries required for configurable roof panels are not integral to vehicle frame members 114, 116, and 119 in the present invention.

Figure 9:
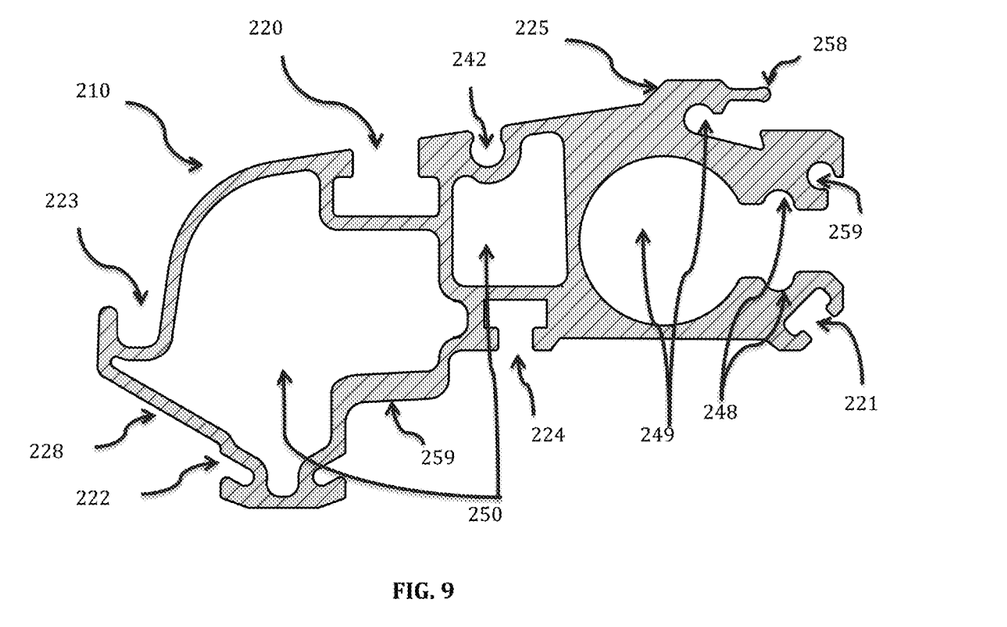
FIG. 9 is a cross sectional view of the most preferred embodiment of the side rails of the roof frame.

Side rails 210 are constructed with attachment features to receive and retain top panels 202, side panels 203, and rear panel 204 as shown in FIG. 7, as well as roof-borne cargo. The most preferred embodiment of these attachment features is shown in FIG. 9. As shown, several slots, tracks, openings, and other attachment surfaces are disposed about the perimeter of the side rails 210. Some of the slots are generally T-shaped as is common with clamping systems in the art. Other slots may be straight or slightly angled to permit a member to be inserted from a direction parallel to the general attitude of the slot. Specifically, top slots 220 are positioned along the top surfaces of the side rails 210 affording attachment locations for roof-mounted accessories or panels. Lateral slots 221 are oriented to provide attachment locations for panels or accessories generally extending between or below the side rails 210. Lower attachment surface 222 is oriented to provide attachment locations for panels or accessories generally extending parallel to the side of the vehicle. This attachment surface may be a generally T-shaped protrusion as shown or may be a slot such as top slots 220. Slot 224 and surface 259 provide locations for attaching side rails 210 to standard attachment points 118 and 113 respectively. Tracks 248 are suitable for capturing and guiding rollers or other devices that facilitate sliding movement of roof top panels 202 along side rails 210. Cavities 249 provide space for mechanized drive components such as motors, cables, belts, screw drives, and the like to be housed within rails 210. Such drive components may be used to automate movement of top panels 202. There is particular advantage to enclosing such drive components, if present, within rails 210, particularly in protecting such elements from damage and simplifying overall assembly of the roof frame.

Other features of side rails 210 that are shown in FIG. 9 include rain gutter 223 and protrusion 225 that inhibits water from entering the passenger space 103 once top panels 202 are in place, and which serves as a channel to inhibit residual water from dripping into passenger space 103 when top panels 202 are not in place. Tapered surface 228 provides a surface against which the vehicle's doors may be sealed, as will be described in more detail below. Protrusion 258 and cavity 259 provide attachment points for flexible sealing elements to prevent debris and water from entering cavities 249. Slot 242 may be present for the purpose of housing wiring that provides electrical power to items mounted on side rails 210. Other electrical wiring, for example, as may be required to provide suitable communications and power for automation functions previously described, may be routed through cavities 250.

Removable inserts that are generally the shape of top slots 220 or slot 242, or covers having a width exceeding the minimum width of these slots, may be supplied to keep these slots clean from debris when not in use.

Side rails 210 are constructed of structural materials most preferably from the group consisting of structural plastics, composites, formed sheet metal, or aluminum. The cross section shown in FIG. 9 may be solid, hollow (as shown), or constructed of multiple materials including an aluminum top slot 220 overmolded or otherwise fixedly assembled into structural plastic that comprises the rest of the structure. Materials and cross section characteristics such as wall thickness can be chosen to optimize strength and cost, by methods common to those skilled in the art. Likewise, the geometry of the cross section may vary in a horizontal plane over the length of side rails 210, in order to complement tapering of the vehicle width, improve seals with the vehicle doors, or provide other functional or aesthetic value, while maintaining a consistent distance between rails to facilitate slidable movement of roof top panels 202. Similarly, side rails 210 may exhibit slight curvature in the vertical plane to provide desirable performance or aesthetic characteristics, while still maintaining the substantially planar shape of the roof frame 201. The features shown in FIG. 9 and described above may be incorporated into side rails 210 by common processes known in the art such as molding, machining, metal forming, and extruding.

Side rails 210 extend from front header assembly 211 to at least standard attachment point 118, but most preferably they continue in length to a point substantially aligned with the rearmost surface of sport utility vehicle 101, maximizing the cargo area 104 enclosed once rear panel 204 is installed. The strength of side rails 210 is selected such that they are capable of thus being cantilevered beyond standard attachment point 118 towards the rear of the vehicle. This roof frame design provides for an attachment point for accessories that is essentially as long as the passenger and cargo areas of the vehicle and is independent of the configuration selected for top panels 202, side panels 203, and rear panel 204.

Side rails 210 are easily configurable in length to accommodate different lengths of sport utility vehicles, for example, 2-door versions and 4-door versions. Likewise, front header assembly 211 and rear header assembly 212 may be easily scaled in size to accommodate different widths of vehicles. In this manner, roof frame 201 may be easily customized for a large variety of convertible sport utility vehicles, assuming suitable mounting locations are available on the vehicle's frame.

Figure 10:
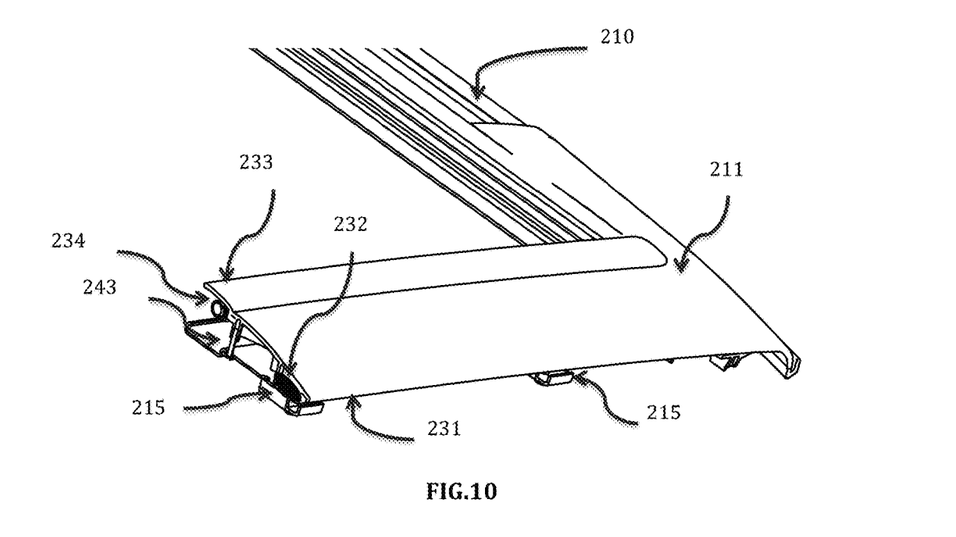
FIG. 10 is a sectioned top-front perspective view of the most preferred embodiment of the front header of the roof frame.

Referring to FIG. 10, front header assembly 211 is supplied with recess 231 that is adapted to receive sealing gasket 232 that is attached to vehicle frame member 114. Front header assembly 211 is secured to standard attachment points 111 on vehicle frame member 114 using clamps 215 that are removably held in place by bolts 216 (see FIG. 11). Alternatively, clamps 215 may be part of a linkage, such as a toggle clamp assembly, which applies a clamping force between front header assembly 211 and vehicle frame member 114. Clamps 215 draw front header assembly 211 onto vehicle frame member 114 such that sealing gasket 232 is compressed suitably to seal the passenger space 103 from wind noise and inclement weather, as is common in prior art hard tops 110 and soft top frame members 151. Ledge 233 and seal gasket 234 are supplied to provide a seal between front header assembly and top panels 202 once such are attached to side rails 210. Trough 243 serves to collect any residual water that may be present in the vicinity of seal gasket 234 when top panels 202 are removed from their sealed position, preventing water from entering passenger space 103.

Front header assembly 211 is constructed of structural materials most preferably from the group consisting of sheet metal, aluminum, structural plastics, and composites. The features shown in FIG. 10 may be incorporated into front header assembly 211 by common processes known in the art such as molding, machining, metal forming, and extruding.

Figure 11:
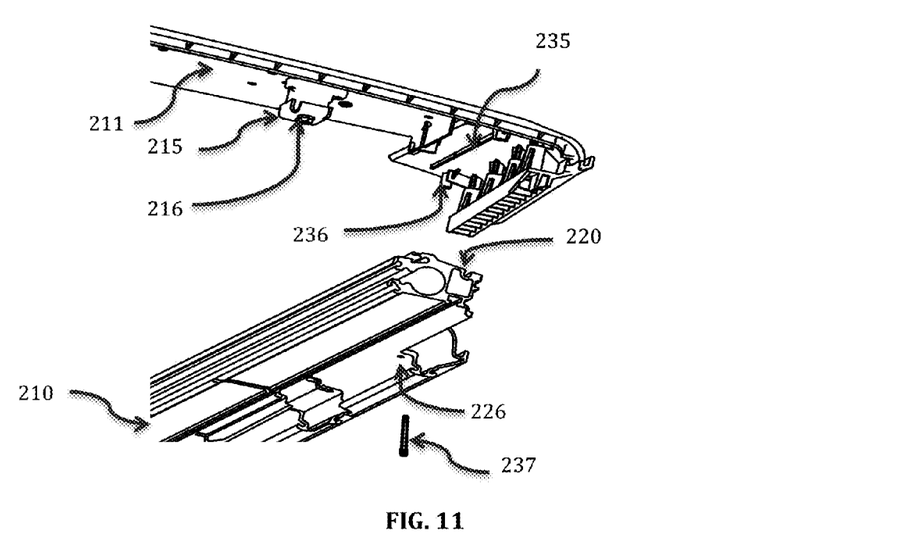
FIG. 11 is a detailed exploded sectional view of the attachment point between side rail and front header.

Referring to FIG. 11, front header assembly 211 is fixedly attached to side rails 210 via protrusion 235 that engages top slots 220, and bosses 236 that engage holes 226 in side rails 210. Bolts 237 thread into bosses 236 and prevent disengagement of front header assembly 211 from side rails 210. Protrusion 235 helps maintain front header assembly 211 in a generally perpendicular attitude to side rails 210.

Figure 12:
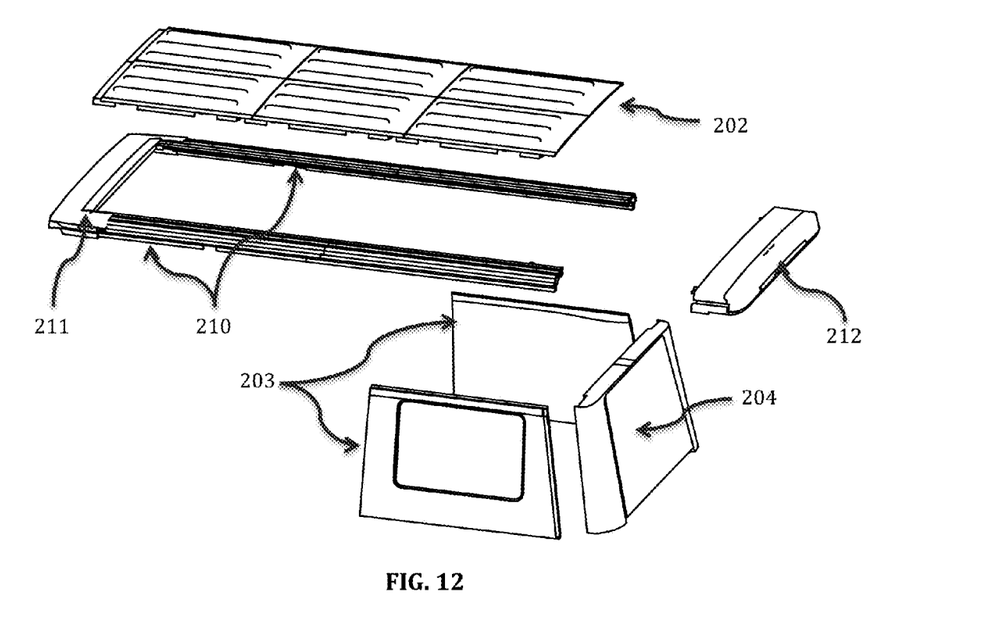
FIG. 12 is an exploded view of the panels attaching to the roof frame that comprise the most preferred embodiment of the present invention shown in FIG. 7.

Referring to FIG. 12, top panels 202, side panels 203, and rear panel 204 are substantially planar, facilitating storage inside cargo area 104 or in roof-top auxiliary cargo space such as rack 205 (FIG. 7). These panels may also be slightly curved to improve overall vehicle aesthetics and performance. Side panels 203 and rear panel 204 may be slightly curved at their corners to provide for desired aesthetics and performance. Alternatively, curved corner panels may be attached between side panels 203 and rear panel 204 to provide curvature to the panel assembly.

Figure 13:
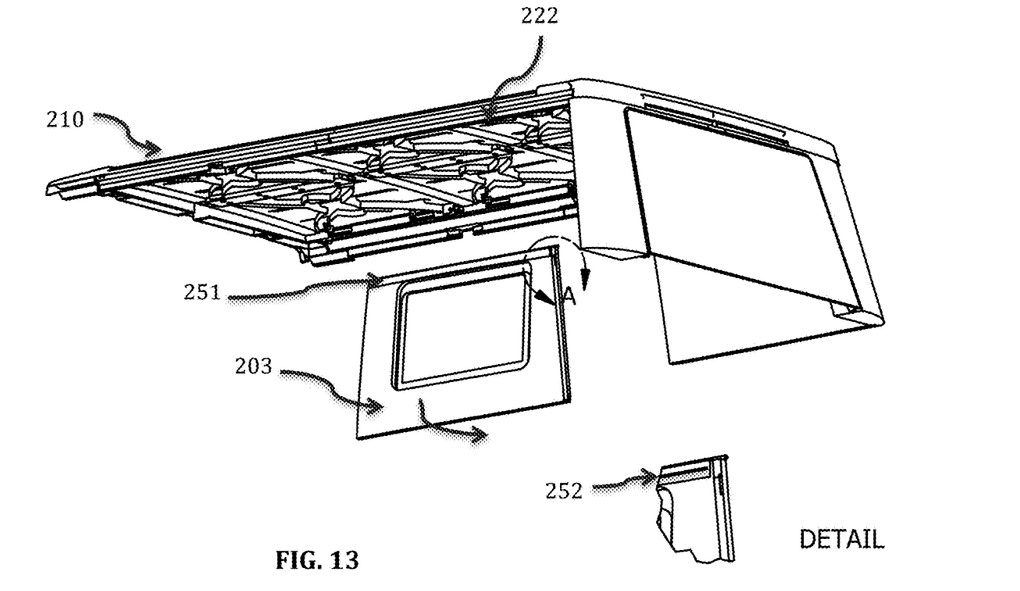
FIG. 13 is a detailed view of the attachment means between roof panels and roof frame according to the most preferred embodiment of the present invention.

In the most preferred embodiment of the current invention side panels 203 are provided with a protrusion 251 on their upper surface, which slidably assembles into lower attachment surface 222 of side rails 210 as shown in FIG. 13. Ribs 252 may be provided on protrusion 251 to effect a seal against lower attachment surface 222 that reduces wind noise and ensures passenger space 103 and cargo area 104 are sealed against inclement weather. Protrusion 251 is positioned on side panels 203 such that an interference between ribs 252 and lower attachment surface 222 is effected when side panels 203 are assembled into place, thereby improving the seal provided. In the most preferable embodiment, protrusion 251 and ribs 252 are optimized for life using methods known to those skilled in the art of injection molding and compliant mechanism design, and are made unitary with side panels 203 through an injection molding process. Protrusion 251 may also be strengthened via fiber reinforcement processes known in the art. Ribs 252 may be composed of an elastomer material that is overmolded onto the base material of the side panels 203. In an alternate embodiment, ribs 252 may be constructed to be slightly larger than lower attachment surface 222 to snap in place or to effect an interference fit when assembled in place.

As an alternative to ribs 252, a gasket 256 (not shown) may be positioned between the side rails 210 and side panels 203 to provide sealing against wind noise and inclement weather. Gasket 256 may also be used to isolate side panels 203 from side rails 210 and reduce noise caused by relative movement of the two members during operation of the vehicle.

Figure 14:
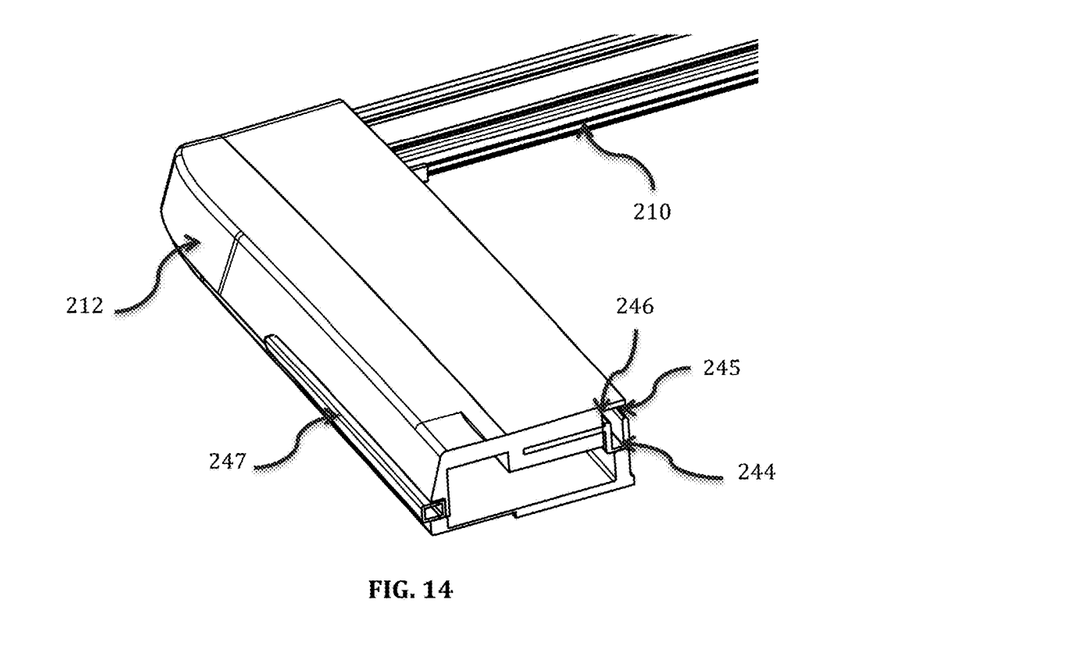
FIG. 14 is a sectioned top-rear perspective view of the most preferred embodiment of the rear header assembly of the roof frame.

Referring again to FIG. 12, rear header assembly 212 assembles onto side rails 210 to capture top panels 202 in roof frame 201. Likewise, rear header assembly 212 may be removed to provide additional vertical space in cargo area 104 or to allow reconfiguring of the roof to suit the preference of the vehicle operator. Referring to FIG. 14, rear header assembly 212 incorporates ledge 245 and seal gasket 246 to provide a seal between rear header assembly 212 and top panels 202 once such are attached to side rails 210. Trough 244 serves to collect any residual water that may be present in the vicinity of seal gasket 246 when top panels 202 are removed from their sealed position, preventing water from entering cargo area 104.

As also shown in FIG. 14, rear light 247 may be embedded in rear header assembly 212. Disconnectable wiring may also be embedded at the attachment point between rear header assembly 212 and side rails 210 to provide electrical power to rear light 247.

Figure 15A:
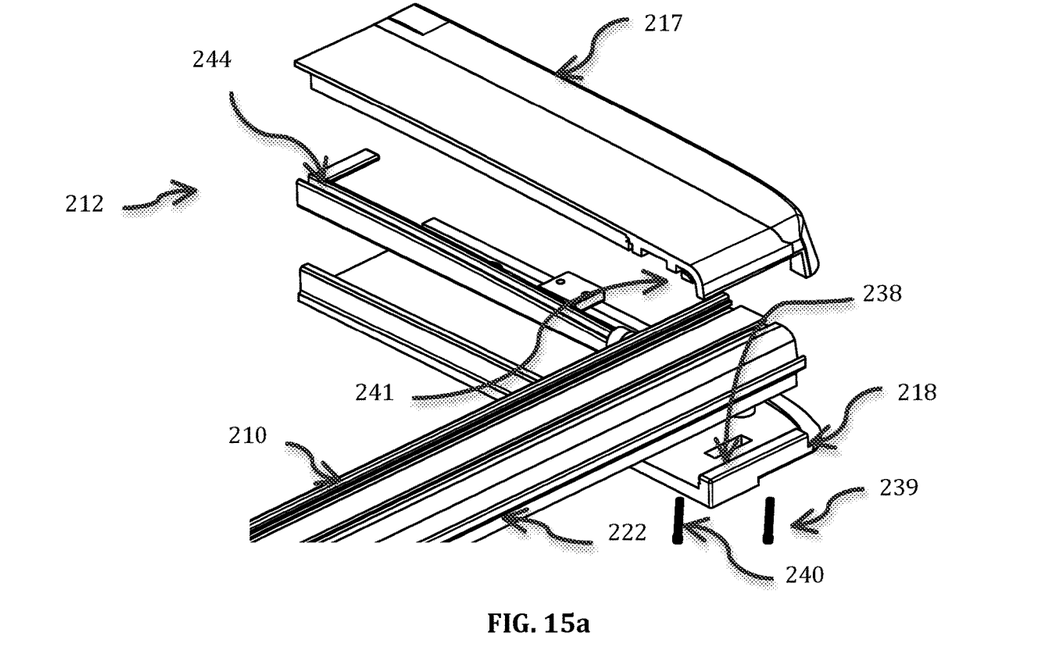
FIG. 15a is a detailed exploded sectional view of the attachment point between side rail and rear header.
Figure 15B:
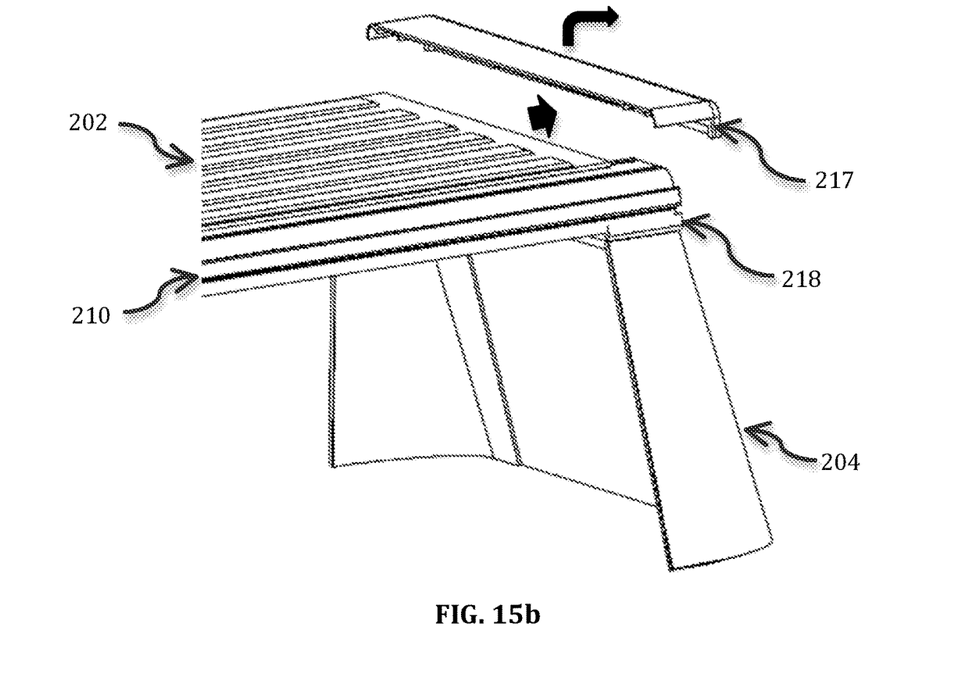
FIG. 15b is a detailed sectional view of the attachment point between side rail and rear header showing the method of capturing a top panel without disturbing an affixed end panel.

Referring to FIG. 15a, rear header assembly 212 comprises upper housing 217 and lower housing 218. Lower housing 218 is fixedly attached to side rails 210 via protrusion 238 that engages lower attachment surface 222, and bolts 239. Alternatively, bolts 239 may be replaced by a clamp that engages the lower attachment surface 222 and prevents disengagement of the lower housing 218 from side rails 210. Upper housing 217 is removably attached to lower housing 218 using bolts 240 that thread into bosses 241. Upper housing 217 may be fixed in place in order to sealably capture top panels 202 in between side rails 210, then removed so that one or more of top panels 202 may be removed without removing lower housing 218 and any panels or accessories attached thereto, as shown in FIG. 15b. Lower housing 218 provides for a fixed platform on roof frame 201, suitable for mounting a motor or other actuating means for opening or closing hinged panel 207 (see FIG. 12). Lower housing 218 may be detached from side rails 210 if required to increase the vertical capacity of cargo area 104.

Rear header assembly 212 is constructed of structural materials most preferably from the group consisting of sheet metal, aluminum, structural plastics, and composites. The features shown in FIGS. 14 and 15 may be incorporated into rear header assembly 212 by common processes known in the art such as molding, machining, metal forming, and extruding.

Figure 16:
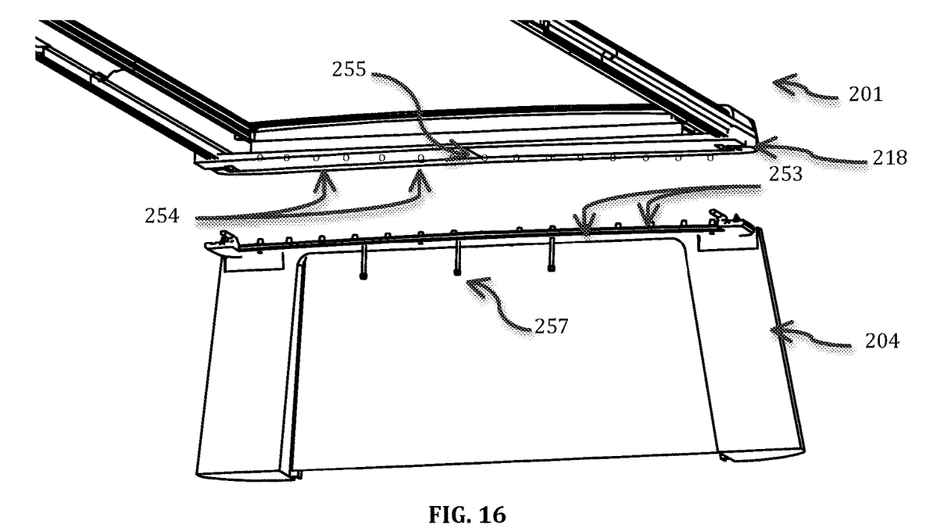
FIG. 16 is an exploded view of the rear panel, detailing how it is attached to the rear header assembly of the roof frame.

Rear panel 204 may also be removably attached to the downward-facing surface of rear header assembly 212. As shown in FIG. 16, in one embodiment of the present invention, a multiplicity of protrusions 253 in the top of rear panel 204 engage openings 254 in the bottom of lower housing 218. Gasket 255 seals the connection surface between rear panel 204 and lower housing 218. Bolts 257 removably fix rear panel 204 in place and compress gasket 255. The bottom surface of rear panel 204 is affixed to standard attachment points 120 on the vehicle frame. Alternatively, rear panel 204 may be attached to rear header assembly 212 using any of a variety of clamping techniques that are known in the art.

Figure 17:
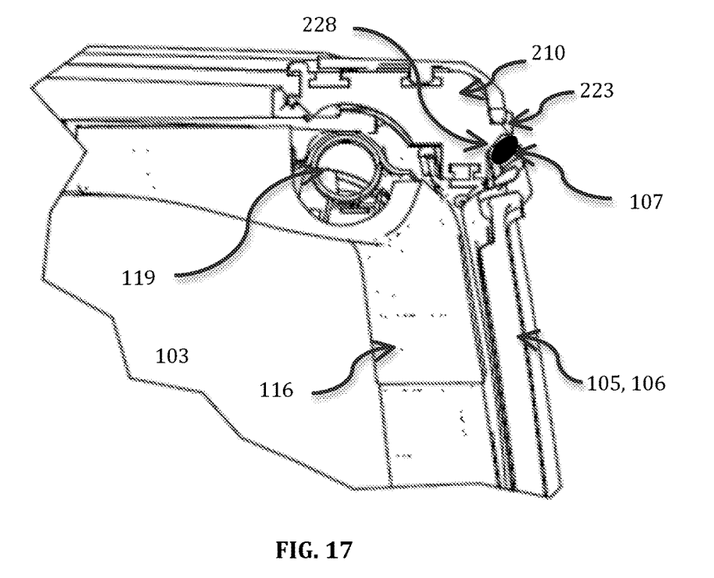
FIG. 17 is a vertical cross-sectional view through the body of the vehicle detailing the means of sealing the frame to the vehicle doors, according to the embodiment shown in FIG. 8.

Referring to FIG. 17, side rails 210 are positioned on vehicle frame members 116 and 119 such that they align substantially with the vertical plane of front vehicle doors 105 and rear vehicle doors 106. Tapered surface 228 on each of side rails 210 is vertically positioned to substantially align with the tops of front vehicle doors 105 and rear vehicle doors 106 and is horizontally positioned to engage and compress door gaskets 107 such that the passenger space 103 is sealed against inclement weather. Side panels 203 are likewise positioned in a plane substantially parallel to the rear vehicle doors 106 and effect a seal along the vertical edge of the rear vehicle doors 106 via door gaskets 107 (see also FIG. 7). Rain gutter 223 is positioned such that it is generally flush with or protruding slightly beyond the outside surface of front vehicle doors 105 and rear vehicle doors 106 to further discourage rainwater from entering the passenger space 103.

Figure 18:
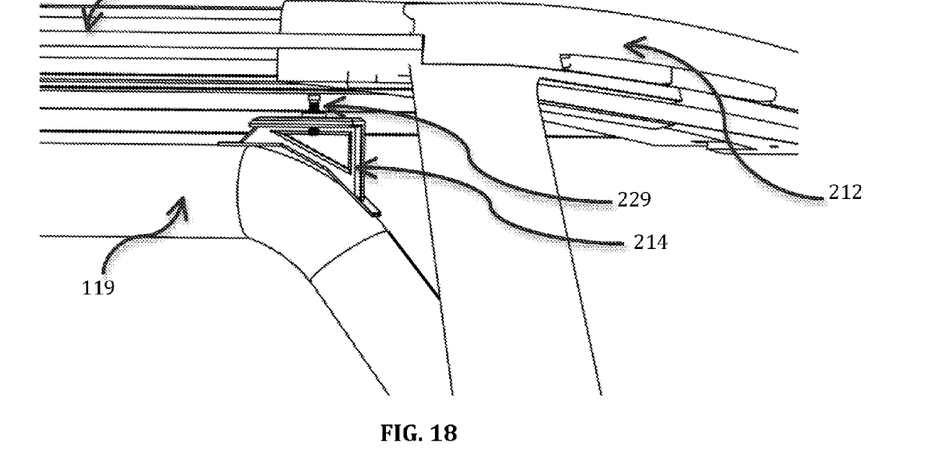
FIG. 18 is a detail view of the means of adjusting the roof frame, according to the most preferred embodiment of the present invention.

Standard manufacturing tolerances or minor model variations for sport utility vehicles may allow for minor dimensional differences between vehicles. Fine tuning of the position of side rails 210 may be desirable to accommodate these differences and provide the most effective seal against front vehicle doors 105 and rear vehicle doors 106. For this reason, adjustment screw 229 is provided to afford adjustment in the vertical plane, as shown in FIG. 18. Alternatively, shims or other adjustment means known in the art may be used in place of the adjustment screw. Slots machined at the attachment points of side rails 210 may also be employed to afford adjustment to the position of side rails 210 in the horizontal plane.

Figure 19:
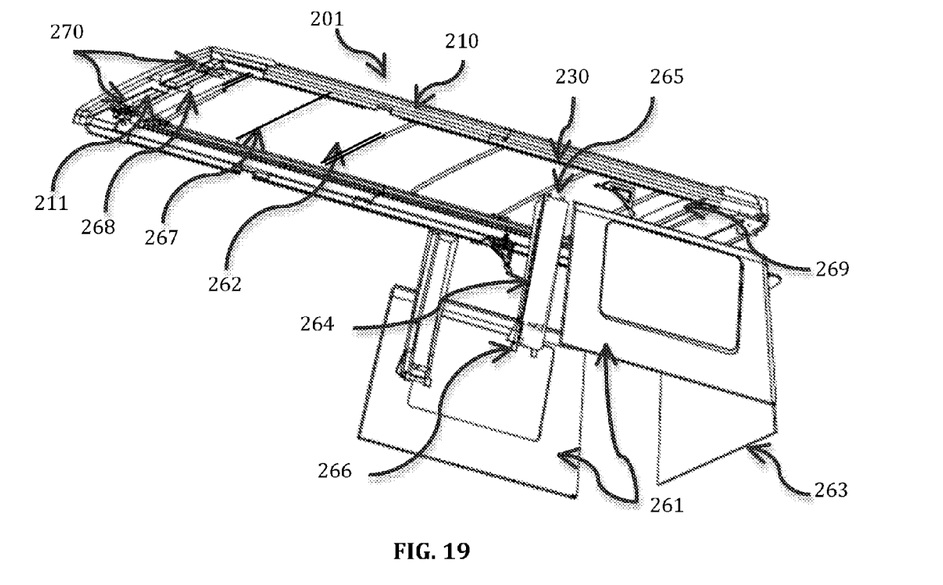
FIG. 19 is a rear perspective view of an alternative embodiment of the roof frame assembly shown in FIG. 7 wherein soft panels are fitted to the roof frame.

It will be evident to anyone skilled in the art that variations from the specific details described above can be made within the scope of the present invention. Some specific variations are given below as examples and are not meant to limit the scope of the invention. For example, the side rails 210 shown in cross section in FIG. 9 need not be unitary but may be made in multiple parts as may be beneficial for manufacturing or other practical or aesthetic reasons. As another example, soft panels composed of flexible fabric and translucent polymers as are common in prior art soft tops may be used in lieu of the more rigid panels depicted above. Referring to FIG. 19, the attachment of soft side panels 261, soft top panels 262, and soft rear panel 263 to roof frame 201 utilizes standard attachment points 112 and 120 as well as lower attachment surface 222 (refer to FIGS. 8 and 9). This scheme is similar to that shown in FIG. 7, except that soft top post 264 is added as a vertical surface to which soft side panels 261 may be attached. This vertical surface permits proper tensioning of the soft side panels and also provides for a rigid surface against which rear vehicle doors 106 may seal via gasket 107 (see FIG. 7) when the vehicle is configured to be used with soft side panels 261. Soft top post 264 is removably attached to each of side rails 210 via holes 230 and lower attachment surfaces 222, into which protrusions 265 may be inserted. Protrusions 266 are inserted into existing holes in standard attachment point 121 to secure the bottom of soft top post 264. Soft top post 264 does not support roof frame 201; rather it is slidably positioned to allow for adjustment in the position of roof frame 201 relative to the vehicle body 102. This adjustment is accomplished via adjustment screw 229 (or other means as described above) and allows for proper tensioning of soft side panels 261 and soft rear panel 263.

Soft top panels 262 may be supported by slidable or removable ribs 267 which are retained in tracks 248, cavities 249, or in lateral slots 221 in side rails 210. Soft top panels 262 may be retracted either forwards or backwards to expose passenger space 103 or cargo area 104, as is the case with the more rigid top panels 202. When it is desirable to extend soft top panels 262 over passenger space 103 or cargo area 104, front slider 268 may be removably attached to front header assembly 211 via clamps 270. Likewise, rear slider 269 may be removably attached to rear header assembly 212. When both front slider 268 and rear slider 269 are thus attached to roof frame 201, soft top panels 262 are held in tension. Soft top panels 262 may alternatively be removably retained in tracks 248, cavities 249, or in lateral slots 221; proper lateral tensioning of soft top panels 262 may be ensured via frame adjustment means described above.

As another alternative embodiment of the roof system, multiple tracks may be arranged vertically in side rails 210 wherein a first top panel segment 202 may be slidably disposed in an upper track and a second top panel segment may be slidably disposed in a lower track such that the panels may slide independently of each other over the full length of their respective tracks. This enables multiple top panel segments to also be stored vertically within the frame.

As yet another alternative embodiment of the present invention, it is possible to construct a roof frame comprised of a single central rail fixedly attached to a front header assembly. In this construction, the central rail contains lateral attachment surfaces on both sides of the rail to accommodate panels that form the top and sides of the roof covering the sport utility vehicle 101. A top attachment surface accommodates a roof-mounted auxiliary cargo space in a manner similar to that shown in FIG. 7.

While the description presented in detail above constitutes the most preferred embodiment as well as a few alternate embodiments of the present invention, it is evident to those skilled in the art that the invention is susceptible to still further variation without departing from the proper scope or fair meaning of the present invention. Furthermore, while the most preferred embodiment has been shown as applied to a specific vehicle design, it is clear that the invention may be applied to different types of vehicle designs.

We claim:

1. A roof frame for a motor vehicle, said vehicle having a front end, a rear end, a cabin frame, a windshield frame, and at least one door on each side of the vehicle, said doors each having an upper edge, said roof frame comprising:
   two rails including attachment surfaces for both roof top panels and accessories, each of said rails having a cross section and a length and having provision for being directly attachable to the vehicle's cabin frame using at least two attachment points, whereby the roof frame receives suitable strength to accommodate roof panels and accessories mounted thereto, and
   a front frame member rigidly attached to the two rails in a perpendicular attitude, and capable of being affixed to the windshield frame,
   wherein said attachment surfaces are oriented to permit independent configuration of roof panels and accessories,
   wherein each rail provides a sealing surface for the upper edge of at least one vehicle door on the side of the vehicle, and
   wherein the cross section of the rails varies over the length of the rails to provide for an outward-facing surface that has a curvature, while an inward-facing surface of a first of the two rails maintains a constant distance from the inward-facing surface of the second rail.

2. A method for reconfiguring a vehicle roof having a roof frame comprising two rails and a rear frame member having a fixed portion and a removable portion, said frame having attachment points for roof panels and an end panel, said method comprising:
   (a) slidably inserting at least one roof panel into a track provided in the roof frame and attaching an end panel to the fixed portion of said rear frame member;
   (b) installing the removable portion of said rear frame member to capture said roof panel in the roof frame;
   (c) removing the removable portion of said rear frame member to create access to the track in the roof frame; and
   (d) slidably removing at least one roof panel from the track in the roof frame without disturbing the position of the end panel.

3. The roof frame of claim 1 further comprising a rear frame member attached to said two rails in a perpendicular attitude, said roof frame further comprising attachment points for side panels and a rear panel wherewith an interior space of the vehicle may be enclosed.

4. The roof frame of claim 1 wherein the rails are removably attachable to pre-existing attachment points on the vehicle's cabin frame, and the front frame member is capable of being affixed to existing attachment points on the vehicle's windshield frame, whereby no permanent modifications to the vehicle are required.

5. The roof frame of claim 1 wherein the rails extend beyond their rearmost attachment points to a point aligned with the rear end of the vehicle.

6. The roof frame of claim 3 further comprising adjustable attachment hardware to accommodate dimensional variations in the vehicle cabin frame and provide for proper fit between rails and side panels.

7. The roof frame of claim 1 wherein the attachment surfaces of the rails comprise a plurality of continuous tracks.

8. The roof frame of claim 1 wherein the roof frame is curved in a vertical plane.

9. The roof frame of claim 1 wherein the rails comprise a plurality of cavities wherein a drive mechanism is enclosed.

10. The roof frame of claim 1, wherein the rails contain an upper surface further comprising channels and protrusions to inhibit water from entering internal vehicle spaces when roof top panels are in place.

* * * * *